G. W. DENSON.
COTTON CHOPPER AND CULTIVATOR.
APPLICATION FILED OCT. 6, 1917.

1,261,720.

Patented Apr. 2, 1918.
2 SHEETS—SHEET 1.

WITNESSES
F. C. Gibson
L. Wilcox

INVENTOR
George W. Denson
BY Victor J. Evans
ATTORNEY

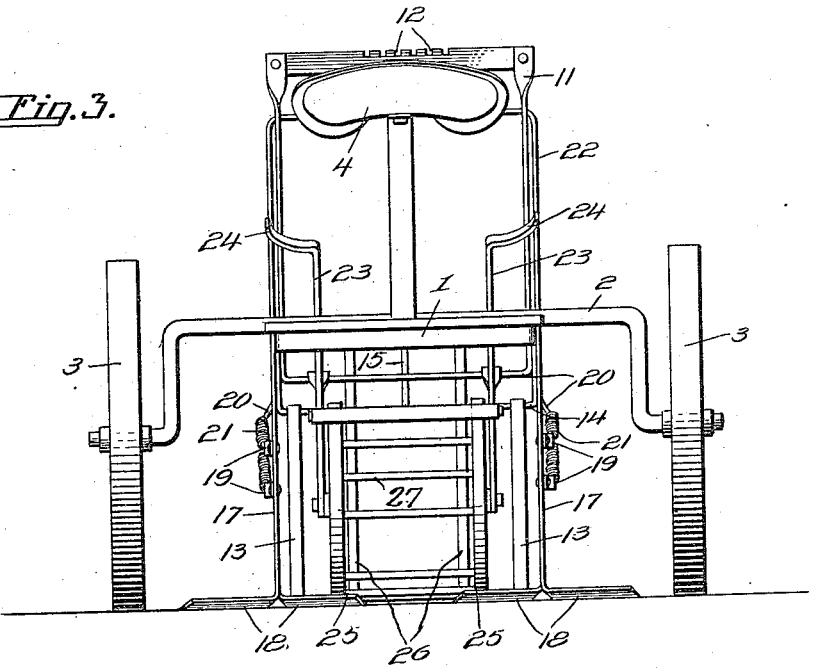
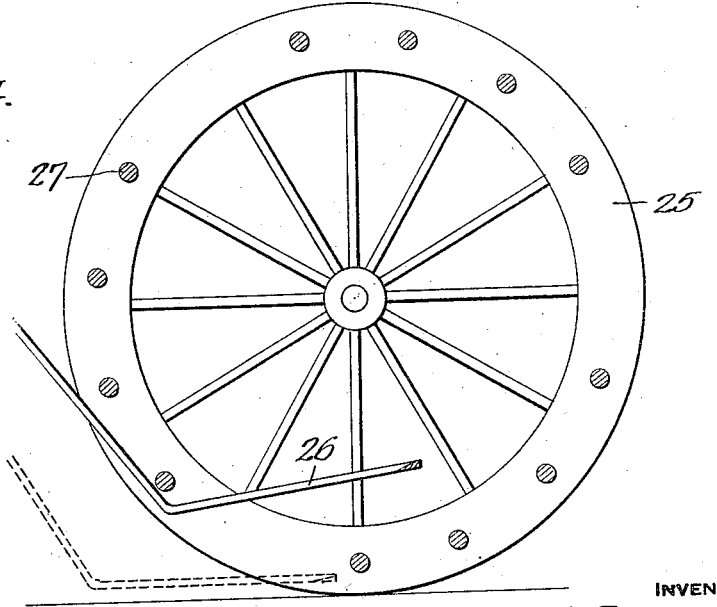

UNITED STATES PATENT OFFICE.

GEORGE W. DENSON, OF DAWSON, ALABAMA.

COTTON CHOPPER AND CULTIVATOR.

1,261,720.

Specification of Letters Patent.

Patented Apr. 2, 1918.

Application filed October 6, 1917. Serial No. 195,099.

*To all whom it may concern:*

Be it known that I, GEORGE W. DENSON, a citizen of the United States, residing at Dawson, in the county of Dekalb and State of Alabama, have invented new and useful Improvements in Cotton Choppers and Cultivators, of which the following is a specification.

This invention relates to a combined cotton chopper and cultivator and it consists in the novel features hereinafter described and claimed.

An object of the invention is to provide a machine of the character stated which may be conveniently used for cutting out the superfluous plants in a row of standing cotton, thereby thinning the row and which may be readily adjusted and adapted to be used as a cultivator when desired for operating upon the soil between the rows and to advantageously cast the surface soil with relation to the standing plants.

In the accompanying drawing:—

Fig. 3 is a rear elevation of the same.

Fig. 4 is an enlarged detailed vertical section through the cotton chopper element.

Figure 1:
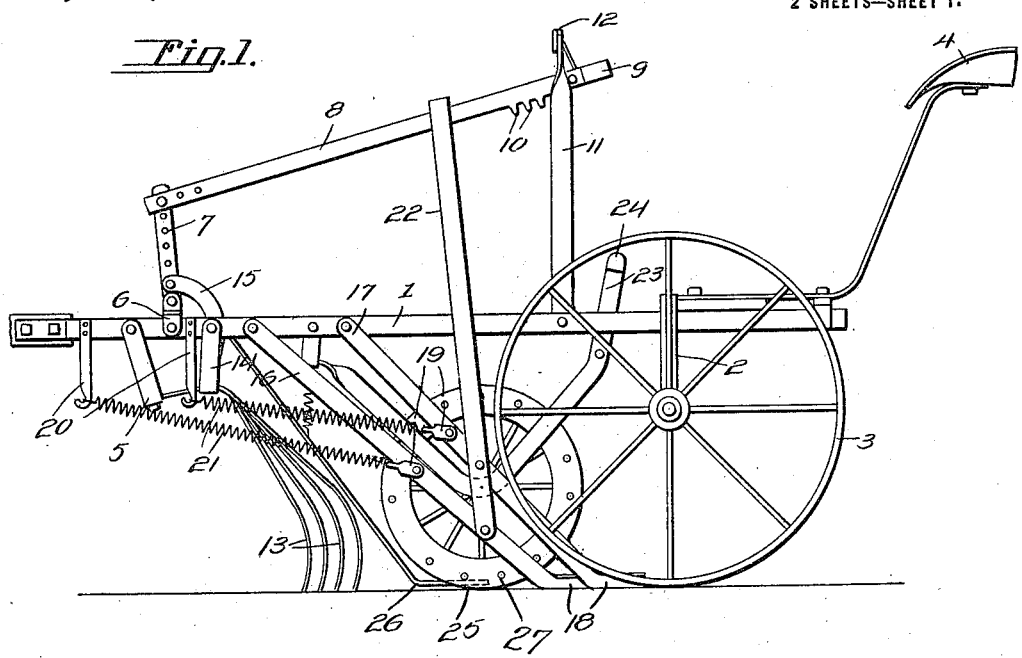
Figure 1 is a side elevation of the combined cotton chopper and cultivator.
Figure 2:
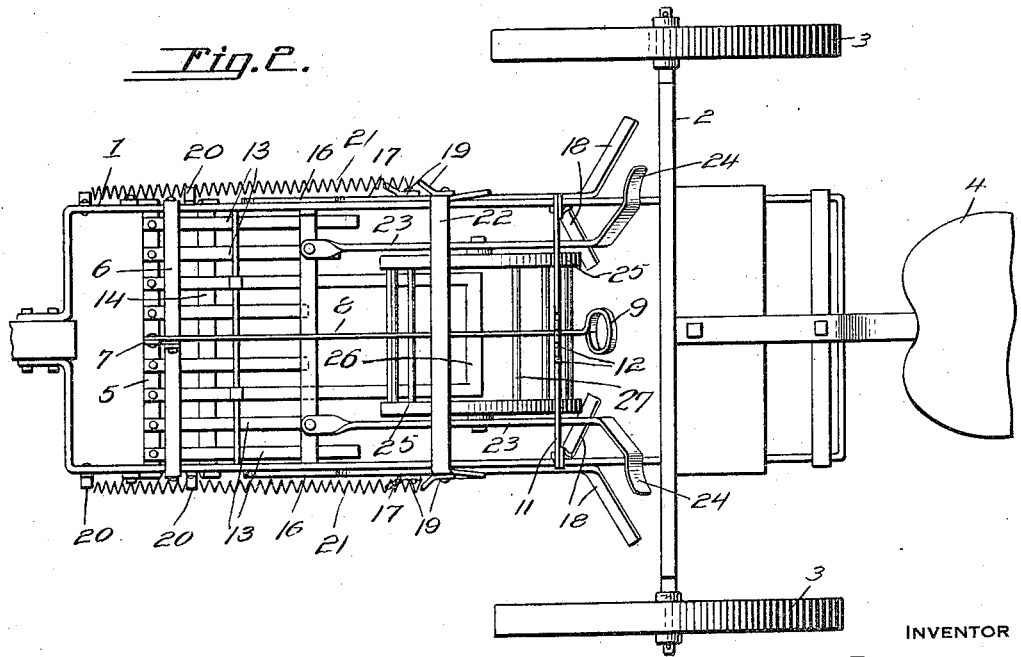
Fig. 2 is a top plan view of the same.

The combined cotton chopper and cultivator comprises a frame 1 which is preferably formed from strips of metal and which is supported at its rear portion upon an arch axle 2. Wheels 3 are journaled upon the ends of the axle 2 and are adapted to travel at the opposite sides of a row of standing plants when the machine is used for chopping out the superfluous plants in the row. An operator or driver's seat 4 is mounted upon the rear portion of the frame 1 in a usual manner. A cross bar 5 is pivotally connected with the forward portion of the frame 1 and a cross bar 6 is mounted upon the forward portion of the said frame at a point behind the bar 5. A lever 7 is pivotally mounted at the intermediate portion of the bar 6 and the forward end of a bar 8 is pivotally connected with the upper portion of the said lever 7. The bar 8 carries at its rear end a handle 9 of conventional form. The bar 8 is provided at its lower edge and in the vicinity of its rear end with a series of downwardly disposed spaced teeth 10. An arch member 11 is mounted upon the intermediate portion of the frame 1 and the rear portion of the bar 8 normally lies under the intermediate portion of the said arch member 11. The said arch member 11 is provided at the intermediate portion of the upper edge thereof with a series of indentations 12 which may receive portions of the bar 8 when the said bar is disposed above the intermediate portion of the said arch member 11 as hereinafter explained.

Two sets of resilient tines 13 are connected at their forward ends with the intermediate portion of the bar 5 and one set of the tines 13 is adapted to move along one side of the row of plants while the other set moves along the opposite side of the said row of plants when the machine is in operation. A bar 14 extends transversely under all of the tines 13 and is connected with the said tines. A link 15 is pivotally connected at one end with the bar 14 and pivotally connected at its other end with the lever 7 hereinbefore described.

It is apparent that by moving the bar 8 longitudinally the lever 7 will be swung upon its pivotal connection with the bar 6 whereby the link 15 is moved longitudinally and hence the bar 14 is raised or lowered and the rear portions of the tines 13 are correspondingly moved. When the bar 8 is moved to such an extent as to carry the handle 9 to a point in advance of the arch member 11 the rear portion of the bar 8 may be swung above the intermediate portion of the arch member 11 and then the bar 8 may be moved rearwardly whereby two of the teeth 10 may straddle the intermediate portion of the arch member 11 and one of the notches 12 may receive the lower portion of the bar 8. Thus means are provided for holding the rear portions of the tines 13 in an elevated position with relation to the surface of the ground.

Arms 16 and 17 are pivotally connected at their upper forward ends with the sides of the frame 1 and the said arms extend downwardly and rearwardly and are provided at their rear ends with sweeps 18 which are disposed at acute angles with relation to each other. Lugs 19 are carried by the arms 16 and 17 and hooks 20 are mounted at the forward portion of the frame 1. Coil springs 21 are connected at their forward ends with the hooks 20 and at their rear ends with the lugs 19 and are under tension with a tendency to hold the sweeps 18 of the arms 16 and 17 against the surface of the soil. Two sets of arms 16 and 17 are employed and one set is located at each side of the frame 1. A yoke 22 is connected at its ends with the arms 16 and 17 at the opposite sides of the machine and the intermediate portion of the said yoke 22 passes over the bar 8 hereinbefore described. When the bar 8 is moved from a lowered to an upper position as hereinbefore described, the intermediate portion of the bar 8 encounters the intermediate portion of the yoke 22 and the rear ends of the arms 16 and 17 are elevated to such an extent as to lift the sweeps 18 above the surface of the soil.

Bars 23 are loosely connected at their forward ends with the frame 1 and have upwardly extending rear end portions provided with stirrups 24. The operator who occupies the seat 4 may place his feet in the stirrups 24 and swing the bars 23 to one side or the other. Spaced wheels 25 are journaled between the bars 23 and a U-shaped knife blade 26 is attached to the frame 1 and the cutting edge of the said blade is located between the wheels 25. The wheels 25 are connected together by groups of rods 27 which are spaced from each other and the groups are spaced from each other for a greater distance than the distance between the rods of each group. The blade 26 is resilient and its lower free end is normally disposed in an elevated position.

When the machine is used for chopping out superfluous plants in a row, it is drawn along the row and the wheels 25 travel upon the soil at the opposite sides of the row. As the rods 27 encounter the blade 26 the free end of the blade is depressed whereby it encounters the plants and cuts them from the row. When the space between two adjacent groups of the rods 27 arrives over the lower end of the blade, the said end springs in an upward direction and passes over the plant and leaves the same standing in the ground. The operator may by using his feet in the stirrups 24 move the bars 23 to properly direct the blade 26 along the row of plants. At the same time the tines 13 will encounter any material or plants which are growing beyond the sides of the row of plants which constitute the crop and these plants will be destroyed and the soil will be cultivated. Furthermore the sweeps 18 will encounter the soil and cast some of it back toward the plants which are left standing in the row and some of the soil will be cast in a direction away from the said plants which are left standing.

When it is desired to use the machine as a cultivator the bars 23 are swung in an upward direction and secured whereby the wheels 25 are held at a position above the soil and the tines 13 and sweeps 18 may be used independently of the wheels 25 and the knives 26 mounted thereon for cultivating the soil between the rows of plants.

From the foregoing description taken in conjunction with the accompanying drawing, it will be seen that a combined cotton chopper and cultivator of simple and durable structure is provided and that the same may be conveniently used to advantage for removing superfluous plants from a row of plants and also for cultivating the soil at the time of chopping out the superfluous plants and at times subsequent thereto.

Having described the invention what is claimed is:—

1. A chopper comprising a frame, bars pivoted to the frame for horizontal swinging movement, spaced wheels journaled to the bars, rods connecting the wheels together and arranged in groups, the groups of rods being spaced from each other and a resilient blade attached to the frame and having a cutting edge lying between the wheels and adapted to be encountered by the bars whereby the said edge is depressed, the said cutting edge of the blade being adapted to swing in an upward direction when the space between adjacent groups of the rods arrive over the said cutting edge.

2. In a cotton chopper, a support, wheels journaled to the support, spaced rods connecting the wheels together, said rods being arranged in groups, the groups of rods being spaced from each other for a distance greater than the spaces between the rods of each group, and a resilient blade mounted upon the support and having a cutting edge lying in the path of movement of the rods.

In testimony whereof I affix my signature.

GEORGE W. $\times$ DENSON.

his
mark

Witnesses:
Jas. A. Ridley,
W. M. McClain.

Copies of this patent may be obtained for five cents each, by addressing the "Commissioner of Patents, Washington, D. C."